United States Patent [19]
Whitlock et al.

[11] Patent Number: 5,490,868
[45] Date of Patent: Feb. 13, 1996

[54] IN-LINE FILTER FOR TUBING

[75] Inventors: Michael B. Whitlock; James A. Bair, both of Cortland, N.Y.; Hidenori Nakayama, Tsutiura, Japan

[73] Assignee: Pall Corporation, East Hills, N.Y.

[21] Appl. No.: 282,769

[22] Filed: Jul. 29, 1994

Related U.S. Application Data

[63] Continuation of Ser. No. 16,294, Feb. 11, 1993, abandoned.

[51] Int. Cl.$^6$ ............................. B01D 46/02; B01D 29/13
[52] U.S. Cl. .................. 55/503; 55/504; 55/509; 210/445; 210/453
[58] Field of Search .............. 55/503, 504, 505, 55/509, 525, 523, 511; 210/445, 453, 455, 459, 460, 461

[56] References Cited

U.S. PATENT DOCUMENTS

| | | | |
|---|---|---|---|
| 622,217 | 4/1899 | Fuller et al. | 55/503 X |
| 3,332,557 | 7/1967 | Pall | 210/495 |
| 3,592,768 | 7/1971 | Parker | 210/445 |
| 3,794,180 | 2/1974 | Blocker | 210/445 |
| 4,442,003 | 4/1984 | Holt | 210/445 |
| 4,702,754 | 10/1987 | Blocker | 55/504 X |
| 4,857,175 | 8/1989 | Spinner | 210/460 X |
| 5,026,478 | 6/1991 | Tanabe et al. | 210/455 X |
| 5,075,004 | 12/1991 | Gershenson et al. | 201/445 |

FOREIGN PATENT DOCUMENTS

| | | |
|---|---|---|
| 2140235 | 1/1973 | France . |
| 1028831 | 4/1958 | Germany . |
| 1199090 | 8/1989 | Japan . |
| 3292475 | 12/1991 | Japan . |
| 3292488 | 12/1991 | Japan . |

OTHER PUBLICATIONS

"MCG Fittings"; Toyoko Kagaku, 1986–1987.
"JSK Fitting"; Sankou Kogyo, 1987–1988.
"Superfine Finish Piping Joint"; Sanko Kogyo, Dec. 1992.

Primary Examiner—Jay H. Woo
Assistant Examiner—Duane S. Smith
Attorney, Agent, or Firm—Leydig, Voit & Mayer

[57] ABSTRACT

An in-line filter includes a hollow base having first and second wall portions formed between its ends and a filter element mounted on the base. During use, the base of the filter is disposed inside a standard tubing connector, and the wall portions are resiliently deformed by the tubing connector such that the surfaces of the wall portions are pressed into sealing contact with internal surfaces of the tubing connector. The filter element connected to the base is disposed inside the tubing connector and/or tubing to which the tubing connector is attached. According to another form of the invention, a filter element includes a hollow base having a radially outwardly extending flange. An annular sealing member is mounted on the flange, and a filter element is mounted on the base. During use, the base of the filter is disposed inside a standard tubing connector, and the sealing member is pressed into sealing contact with internal surfaces of the tubing connector and with the flange.

69 Claims, 8 Drawing Sheets

IN-LINE FILTER FOR TUBING

This application is a continuation of application Ser. No. 08/016,294, filed Feb. 11, 1993, now abandoned.

BACKGROUND OF THE INVENTION

1. Field of the Invention

This invention relates to an in-line filter. More particularly, it relates to an in-line filter which can be used with standard tubing connectors designed for tubing carrying gases used in the manufacture of semiconductors.

2. Description of the Related Art

Various gases are employed in the manufacture of semiconductors. Because particulate matter in the gases can introduce flaws into the semiconductors being manufactured, it is important that the gases be of extremely high cleanliness. Therefore, it is common to install in-line particulate filters along tubing lines for carrying these gases. An in-line filter refers to a filter which has a straight-line flow path (the inlet, the filter element, and the outlet of the filter being coaxial) and which is easily installed in a tubing line.

A conventional in-line filter for use with tubing lines includes a spool-shaped fitting having a tubular body with connections at opposite ends and a filter element welded to the inside of the fitting. In use, the spool-shaped fitting is placed between two sections of tubing which are to be joined, and the ends of the fitting are sealingly connected to the two halves of a standard tubing connector installed on the ends of the tubing sections.

An in-line filter of this type has a number of drawbacks. One is that it increases the length of the tubing line by the length of the spool-shaped fitting, so it may be difficult or impossible to retrofit an existing tubing line with such a filter. Furthermore, because a connection is formed at each end of the spool-shaped fitting, the number of connections in the tubing line is greater than in the absence of the in-line filter, so the number of possible sources of contamination or leakage increases.

SUMMARY OF THE INVENTION

Accordingly, it is an object of the present invention to provide an in-line filter which is extremely compact and does not increase the length of a tubing line in which it is installed.

It is another object of the present invention to provide an in-line filter which can be employed with a variety of types of standard tubing connectors.

It is a further object of the present invention to provide an in-line filter which is simple to install in a tubing line.

It is yet another object of the present invention to provide an in-line filter which is economical to manufacture.

It is a still further object of the present invention to provide a connector assembly for tubing employing a filter according to the present invention.

An in-line filter according to one form of the present invention includes a hollow base having first and second wall portions formed between its ends and a filter element mounted on the base. During use, the base of the filter is disposed inside a standard tubing connector, and the wall portions are resiliently deformed by the tubing connector such that the surfaces of the wall portions are pressed into sealing contact with internal surfaces of the tubing connector. The filter element is disposed inside the tubing connector and/or tubing to which the tubing connector is attached. Therefore, the filter produces no increase in the length of the tubing line in which it is installed. The base of the filter does not contact the main seal of the tubing connector, so the seal integrity of the tubing connector is unaffected by the presence of the filter.

A filter according to another form of the present invention includes a hollow base having a radially outwardly extending flange. An annular sealing member is mounted on the flange, and a filter element is mounted on the base. During use, the base of the filter is disposed inside a standard tubing connector, and the sealing member is pressed into sealing contact with an internal surface of the tubing connector and with the flange. The filter element is disposed inside the tubing connector and/or the tubing line.

As a filter according to the present invention can be installed inside a tubing connector, it produces virtually no increase in the length of the tubing line in which it is installed. Therefore, it can be installed with a minimum of labor and can be easily applied to existing tubing lines.

DESCRIPTION OF EMBODIMENTS OF THE INVENTION

A number of preferred embodiments of an in-line filter according to the present invention will now be described with reference to the accompanying drawings. The embodiments to be described are intended for use in the filtration of gases, and particularly for the filtration of gases used in the manufacture of semiconductors. However, the present invention can be employed for filtering other types of gases and for filtering fluids other than gases.

Figure 1:
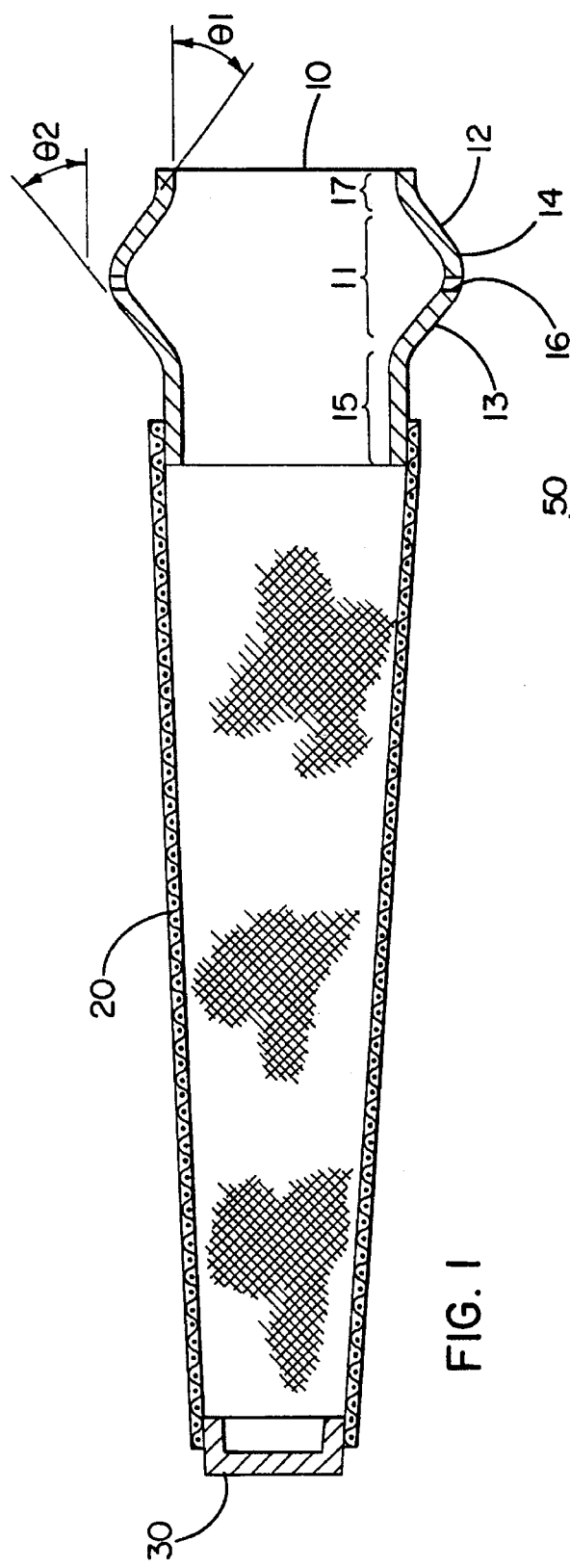
FIG. 1 is a longitudinal cross-sectional view of an embodiment of a filter according to the present invention.

FIG. 1 is a longitudinal cross-sectional view of one embodiment of a filter of the present invention as it would appear prior to installation inside a standard tubing connector. As shown in the figure, the filter comprises a hollow, open-ended, deformable base 10 and a filter element 20. One end of the filter element 20 (which will be referred to as the open end) is attached to the base 10, while the other end (which will be referred to as the closed end) is closed off by suitable means. The filter element 20 does not have any preferred orientation, and fluid can made to flow through the filter from the open end to the closed end or in the opposite direction. However, the collapse strength of the filter element 20, i.e., the ability to resist differential pressures which develop across the filter element 20 without collapsing is generally greater when the open end of the filter element 20 is used as an upstream end and the closed end is used as a downstream end.

The base 10 is made of a resilient material which can elastically or plastically deform into intimate contact with the surfaces of a tubing connector in which the filter is installed. The base 10 will usually be made of a material which is completely impervious to the fluid being filtered, but even if it is not impervious, the material is preferably less porous than the filter element 20 so that particles can not bypass the filter element 20 through the base 10. When the filter is used to filter gases for semiconductor manufacture, the base 10 is preferably made of a corrosion resistant metal, some examples of which are stainless steels such as 316L stainless steel seamless tubing, and nickel alloys such as Hastelloy (a trademark of Cabot Corporation for a high-strength, nickel-base, corrosion-resistant alloy). When the fluid being filtered is non-corrosive, other materials may be used, such as polymers.

A tubing connector in which the filter is installed usually has axial symmetry, and therefore the base 10 will usually have the form of a body of revolution about a longitudinal axis so as to likewise have axial symmetry. The base 10 has two open ends between which are formed first and second wall portions which are spaced from one another and deformable to seal against the internal surfaces of a tubing connector. The wall portions are defined by a bulged section 11 having a peripheral wall with a first wall portion 12 in which the peripheral wall of the base 10 slopes outward with respect to the centerline of the base 10 from the right end of the base 10 in FIG. 1 and a second wall portion 13 in which the peripheral wall of the base 10 slopes inwards with respect to the centerline of the base 10 from the left end of the first wall portion 12. The first and second wall portions 12 and 13 face each other across a gap. In the present embodiment, the first and second wall portions 12 and 13 each have a constant slope θ1 and θ2 with respect to the longitudinal centerline of the base 10. The opposing ends of the first and second wall portions 12 and 13 are connected by an arcuate third wall portion 14 having a varying slope, although it is also possible to form a sharp corner where the first and second wall portions 12 and 13 meet. However, when the base 10 is manufactured from metal tubing such as stainless steel, it is generally easier to form the base 10 with an arcuate wall portion 14 between the sloping first and second wall portions 12 and 13.

The base 10 preferably includes a connecting portion which can be easily attached to the filter element 20. In the present embodiment, the connecting portion is in the form of a tubular section 15 which extends from the left end of the bulged section 11 in FIG. 1. The tubular section 15 is long enough so that the open end of the filter element 20 can overlap it by a short distance to enable easy connection. Although the tubular section 15 in FIG. 1 has a constant diameter, it can instead be formed with a taper.

One or more vent holes 16 may be formed through the peripheral wall of the bulged section 11 to prevent the accumulation of toxic or corrosive gases in the periphery of the base 10 when the filter is installed in a tubing connector.

The base 10 may also include a lip section 17 connected to the bulged section 11 at the end opposite from the tubular section 15. The lip section 17 is helpful when installing the filter into a tubing connector.

The base 10 can be formed into a desired shape by any suitable method, such as hydraulic forming, the application of axial mechanical pressure, axial impact loading, or any combination of the above performed on a blank in the form of a length of tubing. The blank need not have a complicated shape and can have a constant wall thickness and constant diameter. During the shaping process, the wall thickness of the portion of the tubing which becomes the bulged section 11 will normally decrease relative to the initial wall thickness of the tubing. As a result, in the finished base 10, the wall thickness of the bulged section 11 may be smaller than the wall thickness of the tubular section 15. However, the wall thicknesses of the bulged section 11 and the tubular section 15 relative to one another are not critical, and a forming method which produces a finished base 10 with a uniform wall thickness may also be used.

When the base 10 is made of metal, it may be desirable to anneal the metal to improve its ability to seal against the interior surfaces of a tubing connector. When fully annealed, the surface of the base 10 can deform somewhat to fill small surface irregularities in the interior surfaces of the connector.

The exterior surface of the base 10 may be coated with a suitable material to give the surface desired properties. For example, when the base 10 is made of stainless steel, it can be coated with silver or nickel to increase sealability on rougher surfaces. Other examples of possible coating materials are Teflon, silicones, and molybdenum-containing anti-gall coatings.

It is not necessary to create a perfect seal between the exterior surface of the base 10 and the interior surfaces of a tubing connector. It is sufficient to create a seal which acts as a barrier against particulates large enough to be captured by the filter element 20, and the surface finish of the base 10 can be chosen accordingly.

The filter element 20 shown in FIG. 1 has a generally conical shape, but the shape is not critical, and the filter element 20 can instead be cylindrical, bag-shaped, or disk-shaped, for example. It is possible for the filter element 20 to be corrugated, but when the filter is intended for use in connectors for small-diameter tubing, the filter element 20 will usually be non-corrugated due to size considerations. Although the illustrated filter element 20 has a hollow center, it is also possible for the filter element 20 to be solid. The structure and pore size of the filter element 20 can be chosen in accordance with the materials which are to be filtered and the desired flow characteristics through the filter element. As is the case with the base 10, the filter element 20 is preferably made of a corrosion resistant metal, such as stainless steel or Hastelloy, when used for filtering gases used in semiconductor manufacture. An example of a suitable metal filter medium is a depth type filter medium comprised of very fine, short metal fibers sintered together at their points of contact, such as that sold by Pall Corporation under the trademark PMF. Another example is a sintered woven wire mesh such as that sold by Pall Corporation under the trademark Rigimesh. Yet another example is a woven wire mesh having sintered metal powder within the pores of the mesh, such as that sold by Pall Corporation under the trademark PMM. Any of these filter media can be formed of a corrosion resistant metal such as stainless steel or Hastelloy. When the filter is used to filter non-corrosive fluids, a non-metallic filter element can also be employed.

The filter element 20 can be joined to the base 10 by any suitable method. When the base 10 and the filter element 20 are both formed from metal, it is convenient to join the two by a welding method such as laser welding or resistance welding. When the base 10 and the filter element 20 are made of a non-metal such as a polymeric material, they can be joined by conventional methods such as bonding or thermal welding.

As manufactured, the material of which the filter element 20 is made will usually be in the form of a flat sheet. The sheet can be formed into a conical shape by rolling a section of the sheet until the lengthwise edges of the sheet abut or overlap and then joining the edges to one another. When the filter element 20 is made from metal, the lengthwise edges can be conveniently joined by resistance or laser welding, for example, to form a lap weld.

The closed end of the filter element 20 may be closed off in any suitable manner. In the present embodiment, an impervious blind end cap 30 is sealingly connected to the closed end of the filter element 20. The end cap 30 may be made of any material compatible with the fluid being filtered. When the filter is used to filter gases for semiconductor manufacture, the end cap 30 is preferably made of a corrosion resistant metal such as stainless steel or Hastelloy. When the end cap 30 is made of metal, it is convenient to secure it to the filter element 20 by laser or resistance welding along the periphery of the end cap 30, although any suitable joining method can be employed. Instead of using an end cap to close off the closed end of the filter element 20, it is also possible to seal the closed end of the filter element 20 to itself.

Figure 2:
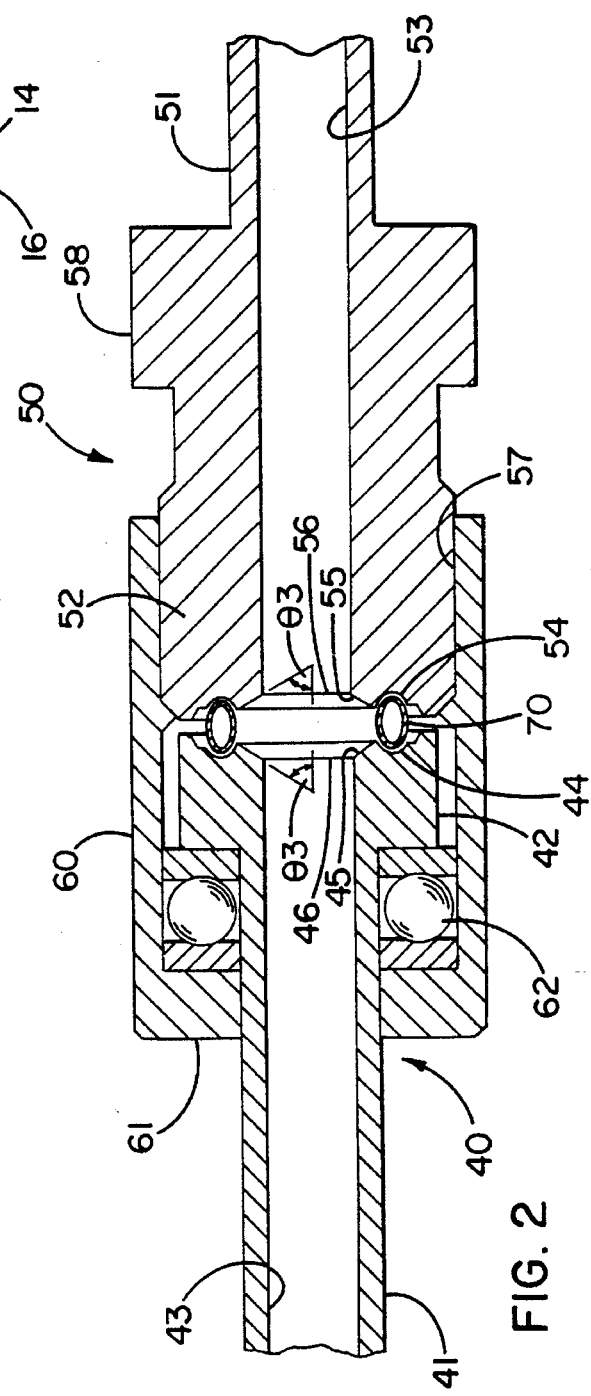
FIG. 2 is a longitudinal cross-sectional view of one type of conventional tubing connector with which a filter according to the present invention can be employed.
Figure 3:
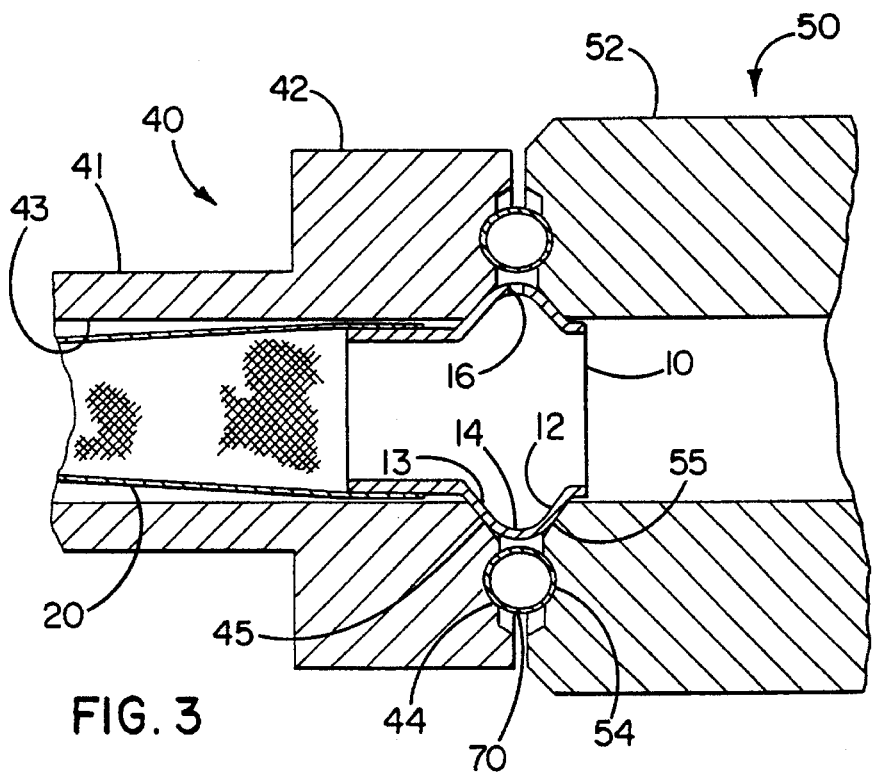
FIG. 3 is a longitudinal cross-sectional view of the filter of FIG. 1 disposed in the tubing connector of FIG. 2 with the base of the filter in a compressed state.

The embodiment of FIG. 1 can be used with a variety of types of standard tubing connectors. FIG. 2 is a longitudinal cross-sectional view of one example of a commercially-available tubing connector with which the present invention can be employed, and FIG. 3 is an enlarged view of a portion of the same tubing connector with the filter of FIG. 1 disposed inside it. The illustrated connector is of the type available from Sankou Kougyou K.K. of Tokyo, Japan and sold under the trademark Super JSK. This connector comprises first and second sections 40 and 50 held together by a connecting nut 60. The first section 40 comprises a tubular portion 41 to which tubing can be attached and an enlarged head portion 42 integrally formed on one end of the tubular portion 41. A cylindrical bore 43 runs through the center of the first section 40 over its entire length. The second section 50 of the connector likewise has a tubular portion 51 and an enlarged head portion 52 integrally formed on one end of the tubular portion 51. A cylindrical bore 53 is formed through the center of the second section 50 over its entire length. When the first and second sections 40 and 50 are joined together, the two central bores 43 and 53 are coaxially disposed. The inner diameters of the central bores 43 and 53 will depend on the inner diameter of the tubing with which the tubing connector is to be employed. For example, in a tubing connector for use with tubing have a nominal outer diameter of ½ inch, the central bores 43 and 53 have an inner diameter of approximately 10.3 mm (approximately 0.406 inches). Therefore, the outer diameter of the filter of FIG. 1 where the filter element 20 is connected to the tubular section 15 of the base 10 is preferably small enough for the filter to fit into either of the central bores 43 or 53.

Each head portion 42 and 52 has an identical annular recess 44 and 54, respectively, formed in its end surface surrounding the central bores 43 and 53 for receiving a sealing member 70. Each annular recess has a roughly semi-circular cross section. The sealing member 70 is typically a conventional spring-loaded C-ring or O-ring, i.e., an annular member with the cross-sectional shape of an O or a C and possibly having a coil spring disposed at its center. When a filter according to the present invention is used to filter corrosive gases such as those used in the manufacture of semiconductors, the sealing member 70 is preferably made of a corrosion resistant metal. FIG. 2 shows the tubing connector assembled to a finger-tight state, and FIG. 3 shows the tubing connector further tightened so that the sealing member 70 is deformed and pressed into sealing contact with the surfaces of the annular recesses 44 and 54.

The radially inner periphery of each annular recess 44 and 54 is connected to the corresponding central bore 43 and 53 by a conical chamfered surface 45 and 55, respectively. When the head portions 42 and 52 are disposed in an opposing relationship as shown in FIGS. 2 and 3, the chamfered surfaces 45 and 55 of the opposing head portions define a cavity which receives the base 10 of the filter of FIG. 1. The edges where the chamfered surfaces 45 and 55 join the central bores 43 and 53 are indicated by reference numerals 46 and 56, respectively.

As shown in FIG. 2, in a Super JSK connector, the chamfered surfaces 45 and 55 are both sloped by the same angle $\theta 3$ with respect to the centerline of the connector. The separation between the first and second wall portions 12 and 13 of the bulged section 11 and their angles of slope $\theta 1$ and $\theta 2$ with respect to the centerline of the base 10 prior to deformation of the base 10 are selected so that when the tubing connector is assembled to its usual tightness so as to produce the desired sealing contact between the sealing member 70 and the annular recesses 44 and 54, the base 10 will be compressed and deformed between the chamfered surfaces 45 and 55 to produce intimate sealing contact between the base 10 and the chamfered surfaces. Preferably, the difference ($\theta 3-\theta 1$) or ($\theta 3-\theta 2$) prior to deformation of the base 10 is in the range of approximately 0 to approximately 20 degrees and more preferably in the range of approximately 2 to approximately 10 degrees.

It is not necessary for the first and second wall portions 12 and 13 of the bulged section 11 to have a constant slope. For example, the bulged section could be substantially circular or elliptical in cross section between its two ends.

External threads 57 are formed on the outside of the head portion 52 of the second section 50, and a hex portion 58 is integrally formed on the second section 50 adjoining the head portion 52 to assist a user in assembling the connector.

The connecting nut 60 is a generally tubular member which surrounds head portions 42 and 52. It has internal threads which engage with the external threads 57 formed on head portion 52 and an end wall 61 having a through hole through which the tubular portion 41 of the first section 40 can pass. A ball bearing 62 is installed inside the connecting nut 60 between the end wall 61 and the head portion 42 of the first section 40 to prevent torque from being transmitted from the connecting nut 61 to the tubing attached to the first section 40.

In order to install the filter of FIG. 1 in a tubing connector in the manner illustrated in FIG. 3, with the first and second sections 40 and 50 of the connector separated from another, the filter is disposed inside one section, such as the first section 40, with the filter element 20 extending into the corresponding central bore, such as central bore 43. A sealing member 70 such as a C-ring is placed into the annular recess 44 of the first section 40, and the second section 50 is then combined with the first section 40 such that the two head portions 42 and 52 oppose one another and the central bores 43 and 53 are aligned. The two sections 40 and 50 are then secured to one another by screwing the connecting nut 60 onto the external threads 57 of the second section 50. As the first and second sections 40 and 50 are drawn towards one another by tightening of the connecting nut 60, the bulged portion of the base 10 of the filter is squeezed between the chamfered surfaces 45 and 55 and is deformed from the shape shown in FIG. 1 into a shape like that shown in FIG. 3 in which the external surface of the bulged section 11 of the base 10 is in intimate surface contact with both of the chamfered surfaces 45 and 55 of the connector. Due to the resilience of the base 10, elastic forces in the base 10 act to resist the deformation, and these forces keep the base 10 pressed against and in sealing contact with the chamfered surfaces. As the base 10 is resiliently deformed between the chamfered surfaces 45 and 55, it can remain in intimate sealing contact with the chamfered surfaces even if the separation between the head portions 42 and 52 varies due to fluctuations in temperature or external loads applied to the head portions.

The filter is preferably reversible, so it can also be installed with the filter element 20 extending into the central bore 53 of the second section 50 of the connector.

As the bulged section 11 is compressed between the chamfered surfaces 45 and 55, the separation between the first and second wall portions 12 and 13 will decrease, and at the same time the diameter of the bulged section 11 will increase. The dimensions of the base 10 prior to deformation are preferably selected so that when the bulged section 11 reaches its maximum diameter during deformation, it will not contact the sealing member 70 in the annular recesses 44 and 54.

If the deformation of the base 10 when it is compressed between the first and second sections 40 and 50 is totally elastic, the base 10 will return to its initial shape when the connector is disassembled, and it is conceivable to reuse the base 10. However, when a filter according to the present invention is used in the manufacture of semiconductors, in order to prevent contamination, the filter element 20 is normally not reused and is discarded rather than being cleaned when its filtering ability becomes impaired due to build-up of particulate matter. Therefore, it is not necessary for the base 10 to be reusable, so there is no need for the deformation of the base 10 to be totally elastic when it is installed inside a tubing connector.

As shown in FIG. 3, the base 10 of the filter is able to fit entirely inside the tubing connector, and the sealing member 70 is compressed to the same extent as it would be in the absence of the filter, so the spacing between the first and second sections 40 and 50 of the connector is unchanged. Therefore, the filter produces no increase in the length of a tubing line in which it is installed. Depending on the length of the filter element 20, a portion thereof may extend into the tubing line, but this does not affect the length of the tubing line. Therefore, the filter can be easily installed in an existing tubing line without the need for any alterations. Furthermore, as the filter does not contact the sealing member 70 of the tubing connector, the seal integrity of the tubing connector is unaffected by the presence of the filter.

Figure 4:
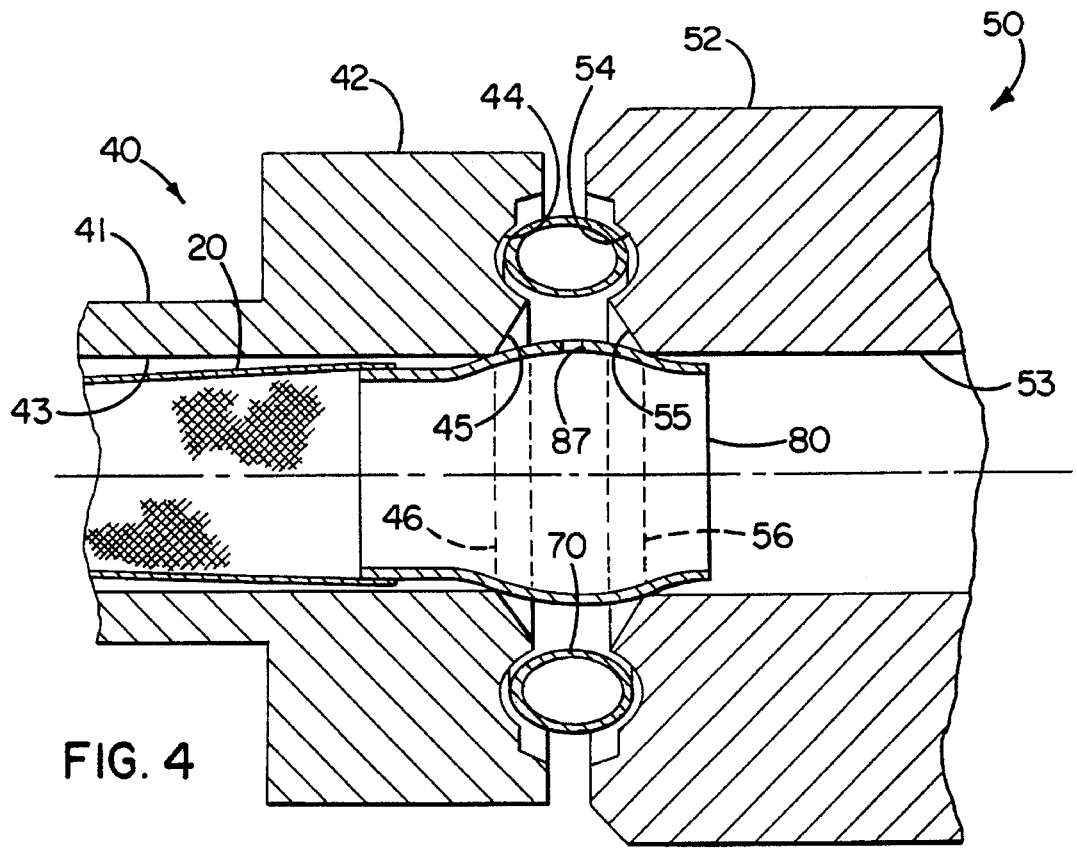
FIG. 4 is a longitudinal cross-sectional view of a portion of another embodiment of the present invention disposed in a conventional tubing connector in an uncompressed state.
Figure 5:
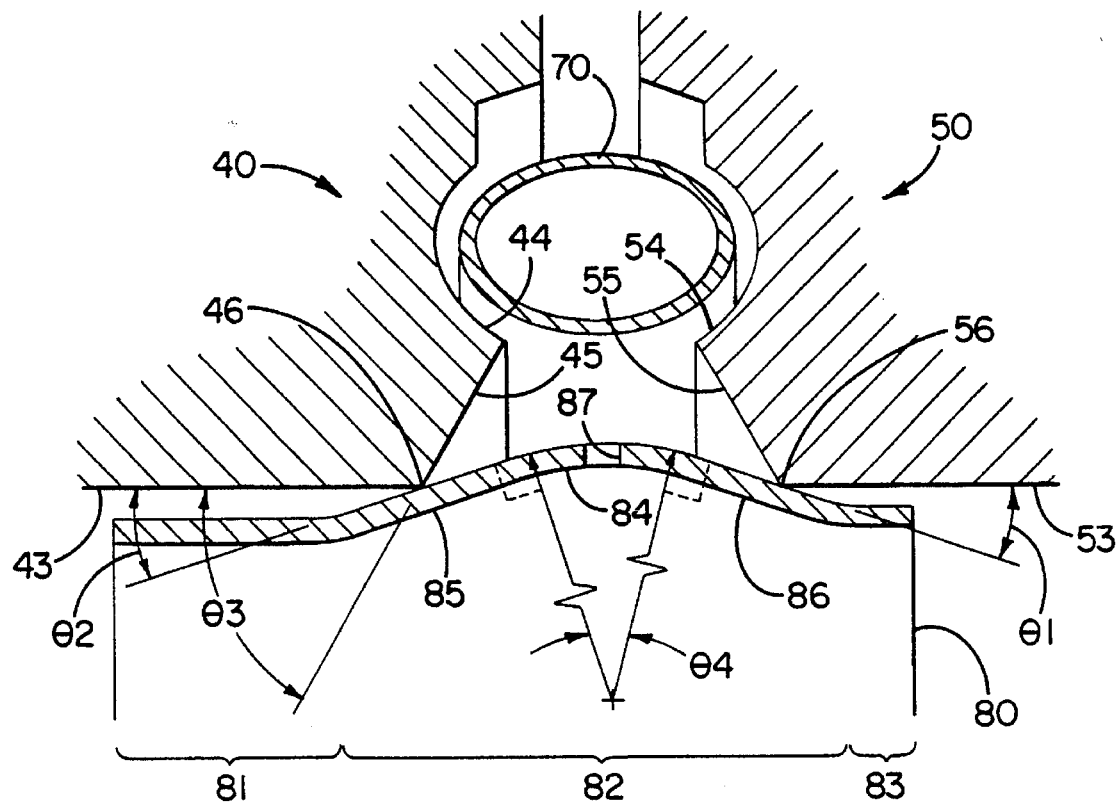
FIG. 5 is an enlarged cross-sectional view of a portion of the embodiment of FIG. 4.
Figure 6:
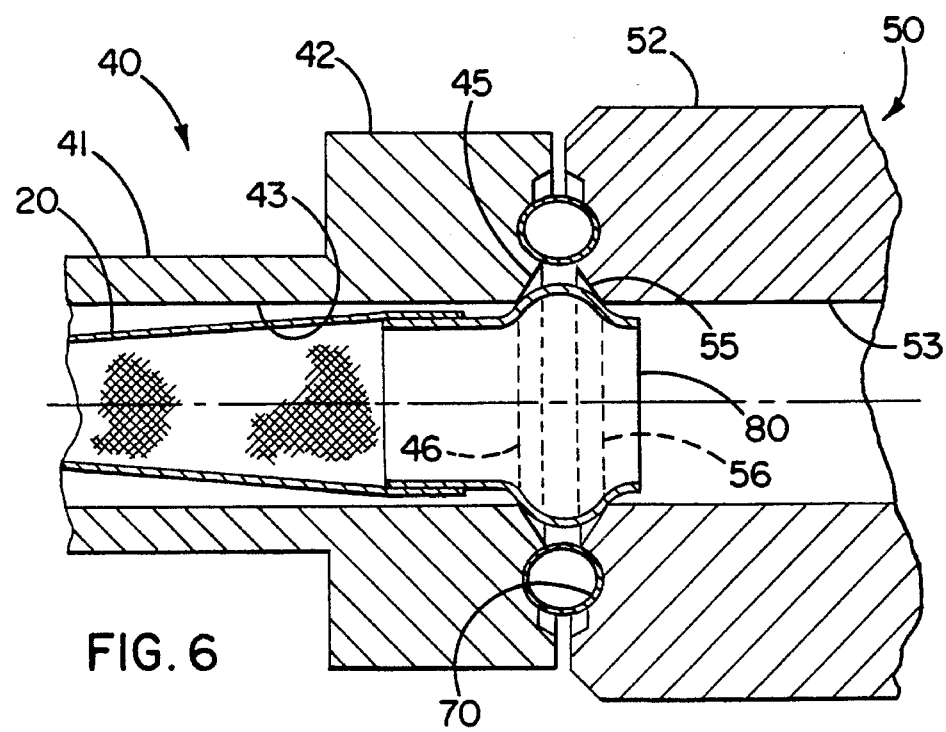
FIG. 6 is a longitudinal cross-sectional view of the embodiment of FIG. 4 in a compressed state.

FIGS. 4–6 illustrate another embodiment of a filter according to the present invention installed within a conventional Super JSK tubing connector. FIG. 4 shows how the filter appears when the tubing connector has been assembled to finger tightness and without any deformation of the filter, FIG. 5 is an enlarged view of a portion of FIG. 4, and FIG. 6 shows how the filter appears when the tubing connector has been adjusted to the tightness under which it is normally used and the filter is deformed into sealing contact with the inside of the tubing connector. This embodiment generally has the same overall structure as the embodiment of FIG. 1 and includes a base 80, a filter element 20 attached to the base 80, and an unillustrated impervious end cap sealingly connected to the closed end of the filter element 20. As best shown in FIG. 5, the base 80 has a tubular section 81 which supports the open end of the filter element 20, a bulged section 82 connected to the tubular section 81, and a lip section 83 connected to the bulged section 82 at the end opposite from the tubular section 81. All three sections 81–83 are coaxial. The base 80 as a whole has the shape of a body of revolution formed by rotating the illustrated cross-section about the longitudinal axis of the base 80.

In contrast to the base 10 in the embodiment of FIG. 1, in which the wall portions of the base 10 are in surface contact with the chamfered surfaces 45 and 55 of a connector, the bulged section 82 of the base 80 of this embodiment has wall portions which are shaped to seal against the edges 46 and 56 where the central bores 43 and 53 join the chamfered surfaces 45 and 55, respectively, of the two sections 40 and 50 of a connector. Therefore, the bulged section 82 is preferably in substantially line contact or very limited surface contact with the two connector sections 40 and 50.

The bulged section 82 need not have any particular shape, but preferably the angles between the outer surface of the bulged section 82 and the surfaces of the connector sections at the points of contact between the two are such that when the connector is tightened by means of the unillustrated connecting nut, the base 80 will be held reliably held in place between the connector sections and will not be blown downstream when system pressure is applied to the filter, and such that the seal created by contact between the bulged section 82 and the connector sections is at least good enough to act as a barrier against particulates large enough to be captured by the filter element 20. Angle $\theta_1$ (measured between a tangent to the outer surface of the bulged section 82 at the point of contact with edge 56 and the inner surface of central bore 53) and angle $\theta_2$ (measured between a tangent to the outer surface of the bulged section 82 at the point of contact with edge 46 and the inner surface of central bore 43) are preferably equal to one another. Furthermore, these angles are preferably greater than 0 degrees and more preferably at least 10 degrees prior to the connector sections 40 and 50 being tightened to one another, i.e., when the base 80 is in an uncompressed state as shown in FIGS. 4 and 5. The angles between a tangent to the outer surface of the bulged section 82 and chamfered surfaces 45 and 55 at edges 46 and 56 are respectively ($\theta_3-\theta_2$) and ($\theta_3-\theta_1$), wherein $\theta_3$ is the angle between a tangent to chamfered surface 45 or 55 and the inner surface of central bore 43 or 53, respectively. The angles ($\theta_3-\theta_1$) and ($\theta_3-\theta_2$) are preferably in the range of approximately 5 to approximately 80 degrees and more preferably approximately 30 to approximately 55 degrees prior to the base 80 being deformed, i.e., when a connector is in a finger-tight state as shown in FIG. 5. For simplicity of manufacture, these angles can be made equal to one another.

The bulged section 82 can have a cross section comprising straight portions of constant slope and/or curved portions of varying slope. For example, in cross section, the bulged section 82 can have the shape of a continuous curve such as an arc of an ellipse or a circle between the tubular section 81 and the lip section 83. Alternatively, the bulged section 82 may include some portions of constant slope. In the embodiment of FIGS. 4–6, the bulged section 82 has a peripheral wall including an arcuate wall portion 84 connected to two spaced apart straight wall portions 85 and 86 of constant slope which extend along tangents drawn from the ends of the arcuate wall portion 84. The arcuate wall portion 84 is an arc of a circle in cross section spanning an angle of θ4 as measured from the center of the circle, which need not coincide with the longitudinal axis of the base 80. Since the arcuate wall portion 84 is circular, θ4 is equal to approximately 2×θ2.

The lengths of the straight wall portions 85 and 86 are preferably chosen so that the edges 46 and 56 of the assembled connector sections 40 and 50 contact the bulged section 82 of the base 80 along the straight wall portions 85 and 86. Because the dimensions of a tubing connector vary within a tolerance range, the exact points on the bulged section 82 which contact the edges 46 and 56 of connector sections 40 and 50 will differ from connector to connector. However, if the points of contact remain within the straight wall portions 85 and 86, the angles θ1 and θ2 can be maintained substantially constant despite variations in dimensions.

The lip section 83 of the base 80 is not necessary to the operation of the filter. However, it is helpful in aligning the first and second sections 40 and 50 when assembling the connector.

As shown in FIG. 6, when the connector sections 40 and 50 are forced towards one another by tightening of the unillustrated connecting nut so as to bring the annular recesses 44 and 54 of the connector sections 40 and 50 into sealing contact with the sealing member 70, the bulged section 82 of the base 80 will be slightly compressed in the axial direction and the spacing between the two straight wall portions 85 and 86 will decrease. At the same time, the peripheral wall of the bulged section 82 will bulge outwards in the radial direction of the base 80. The initial radius of the bulged section 82 is chosen so that when the bulged section 82 has been expanded to a maximum diameter as shown in FIG. 6, it will not contact the sealing member 70 disposed between annular recesses 44 and 54 of the connector sections 40 and 50.

One or more vent holes 87 corresponding to vent hole 16 of FIG. 1 are preferably formed through the wall of the bulged section 82 to vent the space between the outer periphery of the bulged section 82 and the inner periphery of the sealing member 70.

The base 80, the filter element 20, and the unillustrated end cap of the filter of FIG. 4 can be made of the same materials used for the filter illustrated in FIG. 1.

The filter of FIG. 4 can be installed in a connector by inserting the filter into the first section 40 of the connector and then combining the two sections of the connector such that the outer periphery of the bulged section 82 of the base 80 of the filter contacts the edges 46 and 56, as shown in FIG. 4. A connecting nut is then fit over the tubular portion of the first section 40 until it engages with the external threads of the second section 50, and the connecting nut is tightened to urge the first and second sections 40 and 50 towards one another. As the two sections approach one another, the base 80 of the filter is elastically or plastically deformed between edges 46 and 56 of the connector into the state shown in FIG. 6. The resilience of the material forming the base 80, which causes the base 80 to resist the deformation, presses the periphery of the base 80 into intimate contact with edges 46 and 56 and produces a seal therebetween. At this time, the base 80 is primarily in line contact with the edges 46 and 56, but depending on the amount of deformation of the base 80 and the angles θ3 of the chamfered surfaces 45 and 55, there may be some surface contact between the base 80 and the chamfered surfaces. However, as long as a good seal is formed between the base 80 and the connector sections 40 and 50, the existence of surface contact with the chamfered surfaces 45 and 55 is perfectly acceptable.

At the same time that the base 80 is deformed, the sealing member 70 is pressed into sealing contact with the annular recesses 44 and 54 of the connector sections to form the main seal for the connector. The dimensions of the base 80 are preferably chosen so that when the tubing connector is fully assembled state and the bulged section 82 is pressed into sealing contact with the edges 46 and 56 of the connector sections 40 and 50, the sealing member 70 is deformed by the same amount and is sealed against the annular recesses 44 and 54 with substantially the same sealing force as it would be in the absence of the filter. As a result, the filter does not affect the integrity of the seal between the connector sections 40 and 50 created by the sealing member 70.

The filter of FIG. 4 provides the same advantages as the filter of FIG. 1. Furthermore, because the base 80 is in substantially line contact or limited surface contact with the connector sections 40 and 50, a good seal can be created by the base 80 even if the surface finish of the chamfered surfaces 45 and 55 is somewhat rough.

In FIGS. 4–6, the tubing connector in which the filter of the present invention is installed is of the type having chamfered surfaces 45 and 55 connecting the central bores 43 and 63 of the connector with the annular recesses 44 and 54. However, the chamfered surfaces 45 and 55 are not necessary for the purpose of obtaining a seal between the connector and the base 80. Therefore, the filter of FIG. 4 can be installed in a connector not having chamfered surfaces, such as a connector in which the end surfaces of the connector sections meet the central bores at right angles.

Figure 7:
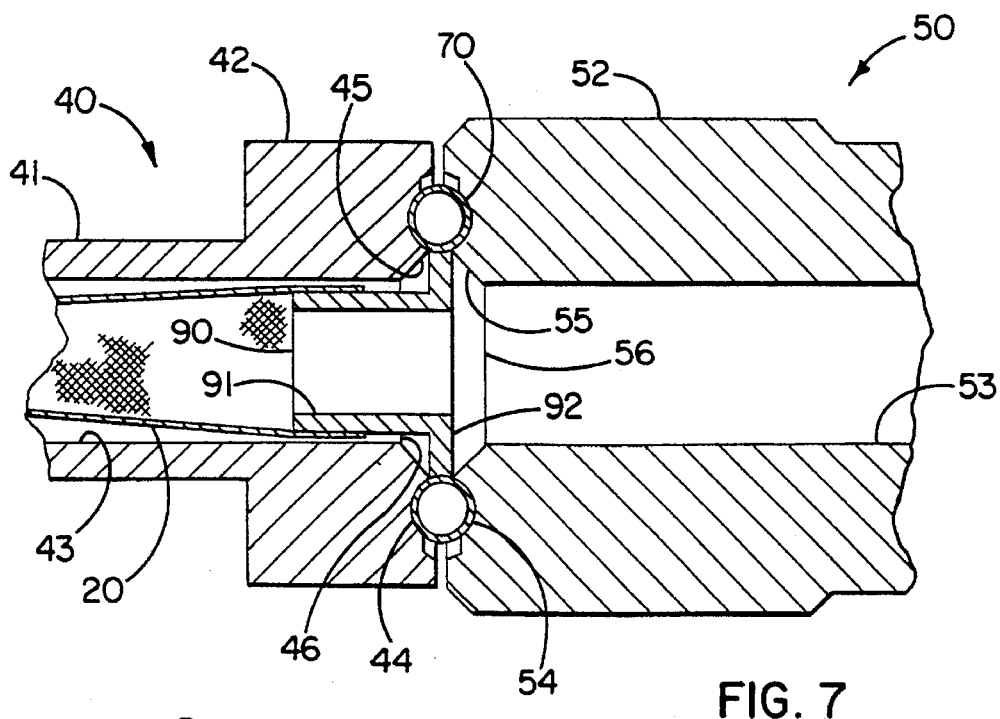
FIG. 7 is a longitudinal cross-sectional view of a portion of another embodiment of the present invention disposed inside a tubing connector.

FIG. 7 illustrates another embodiment of a filter according to the present invention installed inside a Super JSK tubing connector like that shown in FIG. 2. Like the preceding embodiments, it includes a hollow base 90 and a filter element 20 connected to the base 90. This embodiment differs from the previous embodiments with respect to the shape of the base 90 and the manner of forming a seal between the base 90 and the tubing connector. In contrast to the previous embodiments, the base 90 of the filter is sealed against the sealing member 70 for the tubing connector rather than against a surface of the tubing connector itself.

The base 90 of the filter has a connecting portion in the form of a tubular portion 91 for supporting one end of the filter element 20 and a flange 92 extending radially outward from the tubular portion 91. The flange 92 has an outer peripheral surface which is in sealing contact with the sealing member 70. As shown in FIG. 7, in this embodiment, the thickness of the sealing ring 70 measured in the axial direction of the filter is greater than the thickness of the flange 92 measured in the axial direction of the filter. The seal between the flange 92 and the sealing member 70 need only be good enough to prevent particles too large to pass through the filter element 20 from by-passing the filter element 20 by passing between the flange 92 and the sealing member 70 and therefore does not need to have as high an integrity as the seal between the sealing member 70 and the connector sections 40 and 50.

The base 90 can be made of any material which is compatible with the fluid being filtered, and in general can be made of the same materials as the base in the first embodiment. However, as the base 90 of this embodiment does not need to deform in order to form a seal, there are no particular requirements concerning its deformability, and it need not be resilient. Therefore, the range of materials which can be employed is larger than for the base of the embodiment of FIG. 1.

The filter element 20 can be of the same construction as the filter element of the embodiment of FIG. 1 and can be connected to the base 90 in the manner described with respect to the first embodiment. The unillustrated closed end of the filter element 20 is closed off by suitable means, such as a blind end cap like that illustrated in FIG. 1.

When the two sections 40 and 50 of the tubing connector are placed end to end, as shown in FIG. 7, and urged towards each other by tightening an unillustrated connecting nut to press the sealing member 70 into sealing contact with the annular recesses 44 and 54, the sealing member 70 is deformed such that its cross-sectional shape changes from an elliptical shape, like that shown in FIG. 2, to a substantially circular shape. The dimensions of the flange 92 are chosen so that this deformation of the sealing member 70 presses the sealing member 70 into intimate sealing contact with the outer periphery of the flange 92. When the connecting nut is tightened, the base 90 is supported in the connector by means of the sealing member 70, and there need not be any contact between the base 90 and the internal surfaces of the connector. It is also not necessary that the base 90 and the sealing member 70 be in any way connected to one another when the sealing member 70 is in a relaxed, undeformed state. However, for ease of installation of the filter in a tubing connecter, it is convenient if the sealing member 70 is mounted on the flange 92 of the base 90 so as to form a single unit prior to installation of the filter in the connector. Depending on the materials of which the flange 92 and the sealing member 70 are made, it is conceivable to weld the two together, but since the sealing member 70 is usually extremely thin, welding can easily cause deformation of the sealing member 70 and prevent the sealing member 70 from forming a reliable seal against the annular recesses 44 and 54 of the connector. Therefore, preferably the periphery of the flange 92 is shaped to retain the sealing member 70 without the need for any welding.

Figure 8A:
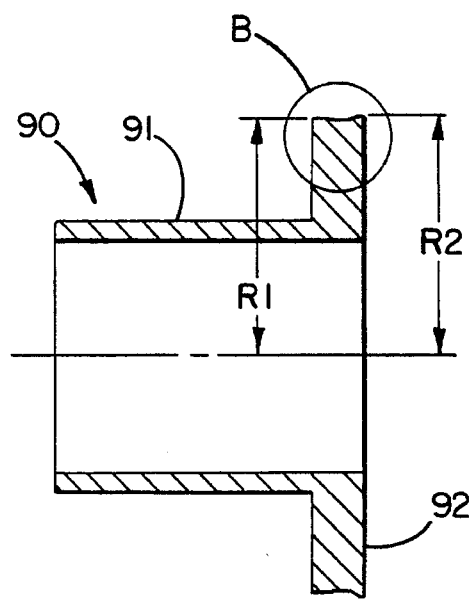
FIGS. 8A and 8B are cross-sectional views of an example of the filter base of the embodiment of FIG. 7.
Figure 8B:
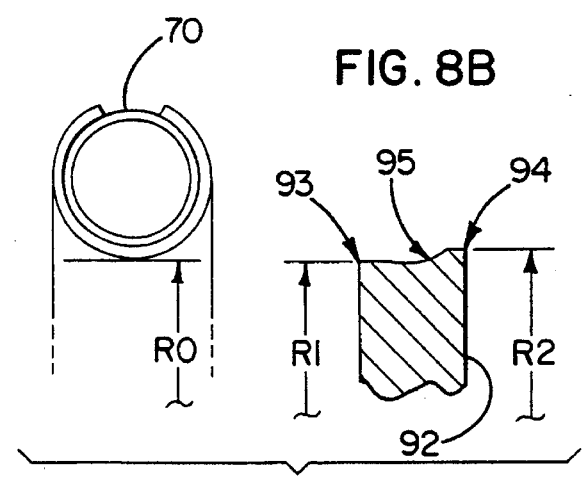

For example, the sealing member 70 can be press fit onto the outer periphery of the flange 92. FIG. 8A is a cross-sectional view of an example of a base 90 with a flange 92 on which a sealing member 70 can be press fit, and FIG. 8B is an enlarged view of region B of FIG. 8A. As shown in FIG. 8B, the outer periphery of the flange 92 has first and second sections 93 and 94 which appear substantially flat as viewed in cross section and a third, curved section 95 connecting the first and second sections 93 and 94. The distance R1 from the centerline of the base 90 to the surface of the first section 93 is selected to be the same or slightly larger than the inner radius R0 of the sealing member 70 in an undeformed state so that there will be an interference fit between the sealing member 70 and the first section 93. The distance R2 of the surface of the second section 94 of the flange 92 is selected to be larger than the undeformed inner radius R0 of the sealing member 70 to prevent the sealing member 70 from sliding over the second section 94. The third section 95 is curved so as to fit tightly against the inner peripheral surface of the sealing member 70 when the sealing member 70 is deformed between the annular recesses 44 and 54 of the connector. The filter element 20 can be attached to the base 90 either before or after the sealing member 70 is mounted on the flange 92. Any desired degree of tightness of the fit between the flange 92 and the sealing member 20 can be attained by suitably selecting the dimensions of the outer periphery of the flange 92.

Figure 9:
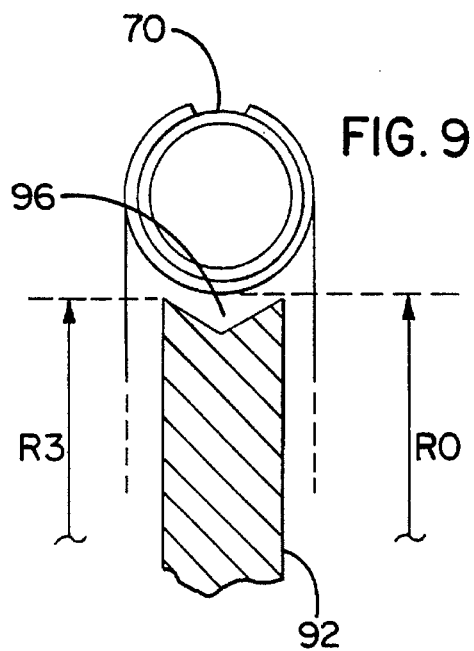
FIGS. 9 and 10 are cross-sectional views of a portion of another example of the filter base of the embodiment of FIG. 7, illustrating how a sealing member is mounted on the base.
Figure 10:
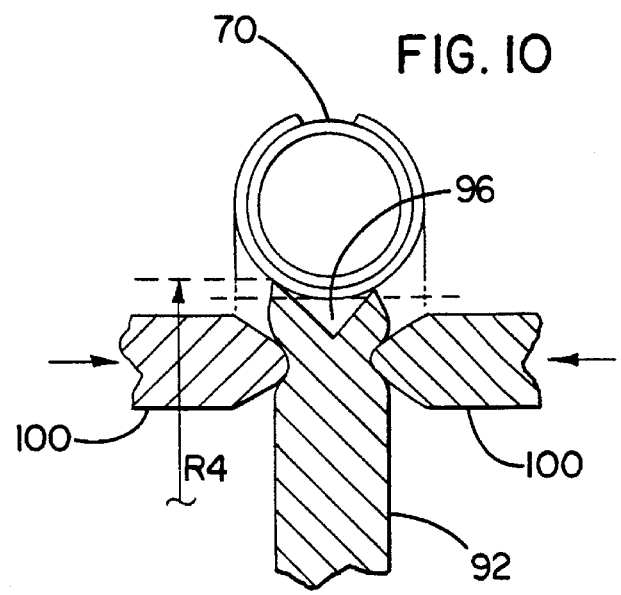

Instead of the sealing member 70 being press fit on the flange 92, the flange 92 can be dimensioned so that the sealing member 70 in an undeformed state fits loosely over the flange 92 but is restrained from slipping off the flange 92 by the shape of the flange 92. FIGS. 9 and 10 are cross-sectional views of a portion of the flange 92 of the base 90 of a filter according to the present invention, illustrating such a flange 92. In this example, a V-shaped notch 96 is formed in the flange 92 around its entire periphery. In order to mount the sealing member 70 on the flange 92, the sealing member 70 is first placed over the flange 92 as shown in FIG. 9. At this time, the sealing member 70, which is in an undeformed state, may contact the notch 96, or the two may be separated by a radial gap. Namely, the distance R3 from the longitudinal centerline of the base 90 to the radial outer edge of the flange 92 can be less than the inner radius R0 of the sealing member 70. The flange 92 is then deformed around its entire periphery by a suitable tool 100 so as to drive the two sides of the notch 96 towards each other and restrain the sealing member 70 from coming off the flange 92, as shown in FIG. 10. It is not necessary that the edges of the flange 92 deform the sealing member 70 in any way, and the sealing member 70 can even be separated from the flange 92 by a gap. It is sufficient that the distance R4 from the centerline of the base 70 to the outer edges of the flange 92 in the deformed state be greater than the undeformed inner radius R0 of the sealing member 70. The combined base 90 and sealing member 70 can then be installed in a tubing connector in the manner illustrated in FIG. 7. When the two sections 40 and 50 of the connector are urged towards one another, the sealing member 70 is deformed into intimate sealing contact with the inner surface of the notch 96 in the flange 92.

Figure 11:
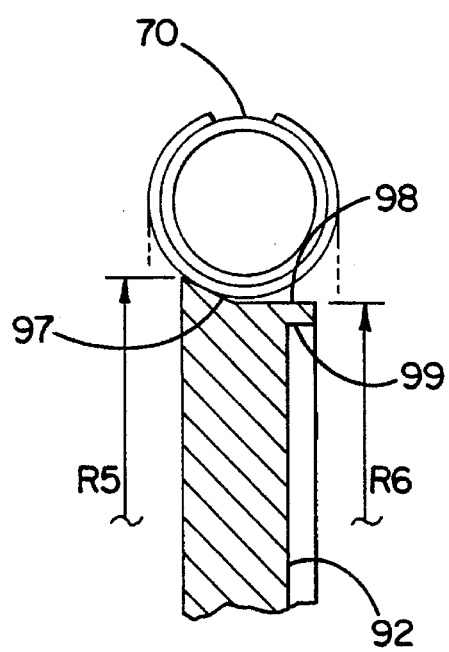
FIGS. 11 and 12 are cross-sectional views of a portion of yet another example of the filter base of the embodiment of FIG. 7.
Figure 12:
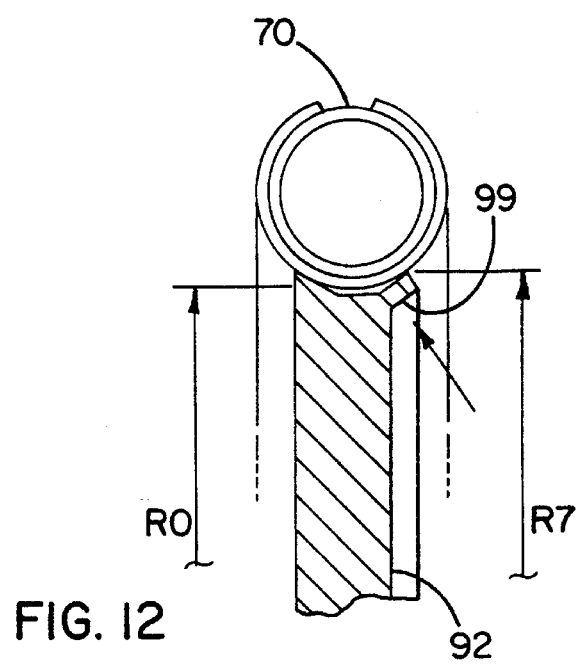

FIGS. 11 and 12 illustrate yet another method of installing a sealing member 70 on the flange 92 of the base 90 of a filter according to the present invention. In this example, the outer periphery of the flange 92 has a sloping surface 97 and a flat surface 98 adjoining the sloping surface 97, both surfaces 97 and 98 extending around the circumference of the flange 92. The flat surface 98 overhangs the side surface of the flange 92 to form a lip 99. To install the sealing member 70 on the base 90, it is first loosely fit over the periphery of the flange 92 as shown in FIG. 11. The distance R6 from the centerline of the base 90 to the flat surface 98 may be smaller than the inner radius R0 of the sealing member 70 in an undeformed state so that the sealing member 70 can slide easily onto the flat surface 98. The distance R5 from the centerline of the base 90 to the outer edge of the sloping surface 97 is preferably larger than the inner radius R0 of the undeformed sealing member 70 so that the sloping surface 97 can restrain the lateral movement of the sealing member 70. After the sealing member 70 is positioned as shown in FIG. 11, the lip 99 is bent radially outward along its entire circumference by the application of force in the direction of the arrow in FIG. 12 so that the distance R7 from the centerline of the base 90 to the edge of the lip 99 is now greater than the inner radius R0 of the undeformed sealing member 70. In this state, the sealing member 70 is now restrained from slipping off the flange 92, and the filter and the sealing member 70 can be installed in a tubing connector as a single unit. It is not necessary for the lip 99 of the flange to deform the sealing member 70 in any way when the lip 99 is bent outward. Furthermore, it is possible for there to be gaps between surfaces 97 and 98 of the flange 92 and the undeformed sealing member 70. When the filter and the sealing member 70 are installed in a tubing connector and the sections 40 and 50 of the connector are urged towards one another, the resulting deformation of the sealing member 70 will produce intimate sealing contact between the sealing member 70 and the flange 92.

Figure 13:
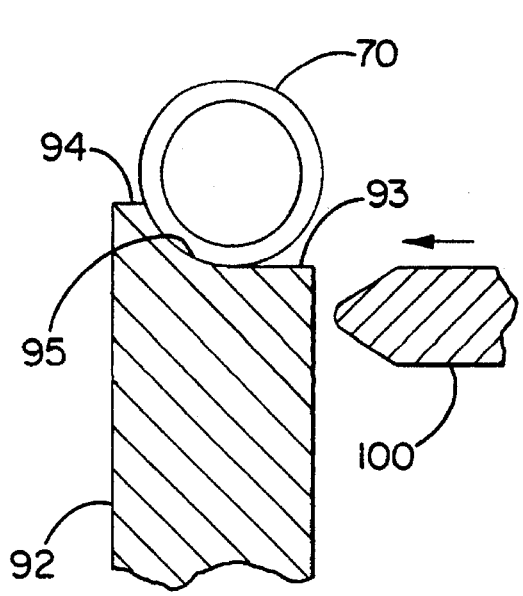
FIGS. 13 and 14 are cross-sectional views of a portion of a further example of the filter base of the embodiment of FIG. 7.
Figure 14:
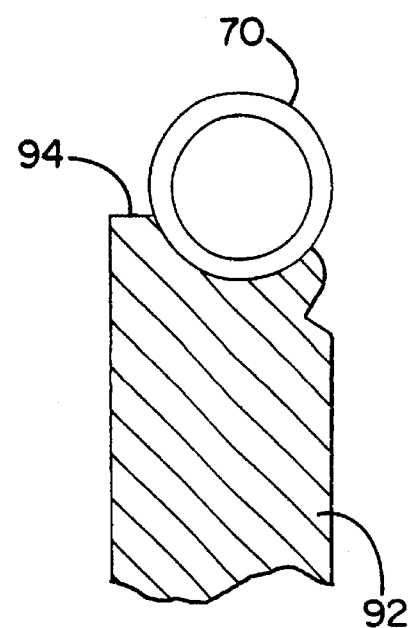

FIGS. 13 and 14 show another method of installing a sealing member on the flange 92 of the base 90. The flange 92 in this example has the same shape as the flange 92 in FIGS. 8A and 8B, with an outer periphery having first and second sections 93 and 94 connected by a curved section 95. However, the distance R1 from the centerline of the base 90 to the surface of the first section 93 may be smaller than the undeformed inner radius R0 of the sealing member 70 to allow the sealing member 70 to easily slide onto the first section 93. After a sealing member 70 is mounted on the outer periphery of the flange 92 as shown in FIG. 13, a suitable tool 100 is pressed in the direction of the arrow against the lateral surface of the flange 92 adjoining the first section 93 around its entire periphery. As a result, the first section 93 is deformed outwards towards the sealing member 70 as shown in FIG. 14, thereby retaining the sealing member 70 on the flange 92. In the state shown in FIG. 14, there can be a loose fit between the flange 92 and the sealing member 70, because sealing contact between the sealing member 70 and the flange 92 is created when the sealing member 70 is compressed between the two sections of a tubing connector. When this method of installing the sealing member 90 on the flange 92 is employed, the manufacturing tolerances for the outer periphery of the flange 92 can be less strict than when the method illustrated in FIGS. 8A and 8B is employed, since the dimensions of the first section 93 in the undeformed state are not critical for retaining the sealing member 70 on the flange 92. Therefore, the flange 92 can be economically manufactured.

Figure 15:
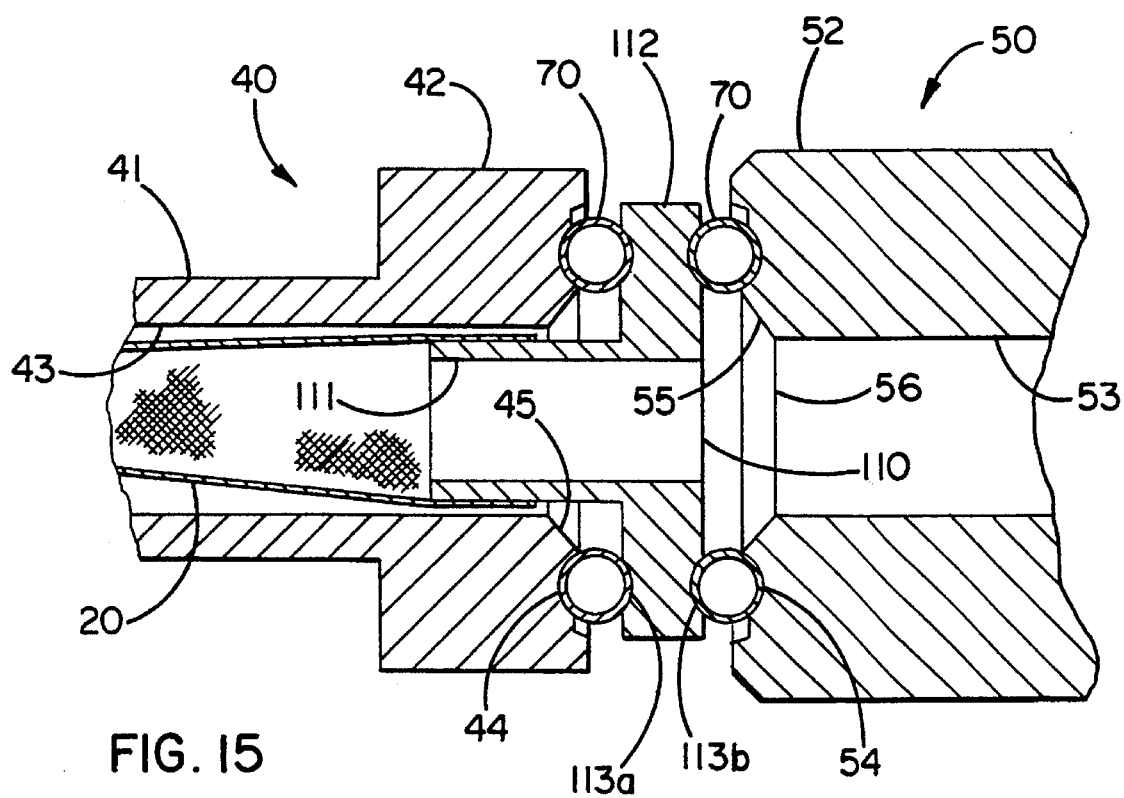
FIG. 15 is a longitudinal cross-sectional view of a portion of another embodiment of the present invention installed in a tubing connector.

FIG. 15 is a longitudinal cross-sectional view of a portion of another embodiment of a filter according to the present invention installed in a conventional Super JSK tubing connector. The filter comprises a hollow base 110 and a filter element 20 sealingly connected to one end of the base 110. The base 110 has a connecting portion in the form of a tubular portion 111 which supports the filter element 20 and a flange 112 extending radially outward from the tubular portion 111. When the filter is installed in a connector, the flange 112 is sandwiched between the first and second sections 40 and 50 of the connector. First and second annular recesses 113a and 113b are formed in opposite lateral surfaces of the flange 113. The distance of each recess 113a and 113b from the longitudinal centerline of the filter matches the distance of the annular recesses 44 and 54 in the connector from the centerline of the connector. Therefore, when the filter is installed in a connector, as shown in FIG. 15, each of the annular recesses 113a and 113b in the flange 112 opposes one of the annular recesses 44 and 54 in the connector. When assembled, the connector is equipped with two sealing members 70, one of which is disposed between annular recesses 113a and 44 and the other of which is disposed between annular recesses 113b and 54. When the two sections 40 and 50 of the connector are urged towards each other by an unillustrated connecting nut, the sealing members 70 are pressed into intimate sealing contact with the annular recesses 113a and 113b of the flange and with the annular recesses 44 and 54 of the connector. The integrity of the seal between the sealing members 70 and the lateral surfaces of the flange 112 is preferably as good as the integrity of the seal between the sealing members 70 and the two sections 40 and 50 of the connector.

The base 110 and the filter element 20 can be made of the same materials used for these members in the previous embodiments. The closed end of the filter element 20 can be sealed by any suitable means, such as by an impervious end cap like that illustrated in FIG. 1.

The flange 112 of the base 110 can be a thin member which produces only a small increase in the length of the assembled tubing connector. Therefore, the embodiment of FIG. 15 can be easily installed in an existing tubing line.

Figure 16:
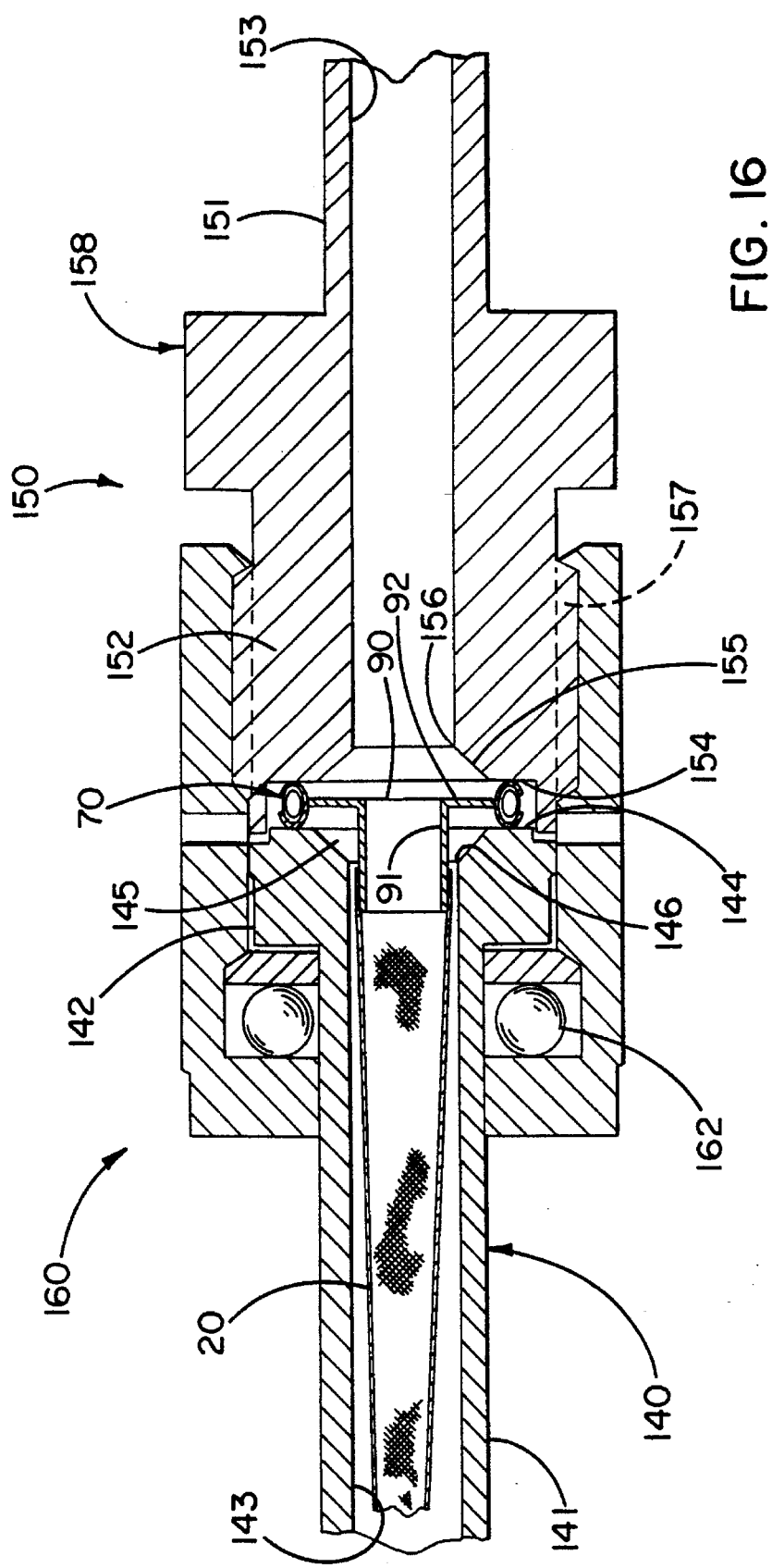
FIG. 16 is a longitudinal cross-sectional view of the embodiment of FIG. 7 installed in another conventional type of tubing connector.

FIGS. 1–15 show embodiments of the present invention applied to a Super JSK tubing connector, but the present invention is applicable to other types of conventional tubing connectors as well. FIG. 16 illustrates an embodiment of the present invention applied to a conventional tubing connector available from Toyoko Kagaku Co. Ltd. of Japan and referred to as an MCG tubing connector. The overall structure of an MCG tubing connector is similar to that of a Super JSK tubing connector, and portions of the MCG connector in FIG. 16 corresponding to the Super JSK connector in FIG. 2 are indicated by reference numerals 100 higher than the references numerals of corresponding portions in FIG. 2.

The MCG connector of FIG. 16 includes first and second sections 140 and 150 held together by a connecting nut 160. The first section 140 comprises a tubular portion 141 to which tubing can be attached and an enlarged head portion 142 integrally formed on one end of the tubular portion 141. A cylindrical bore 143 runs through the center of the first section 140 over its entire length.

The second section 150 of the connector likewise has a tubular portion 151 and an enlarged head portion 152 integrally formed on one end of the tubular portion 151. A cylindrical bore 153 is formed through the center of the second section 150 over its entire length. When the first and second sections 140 and 150 are joined together, the two central bores 143 and 153 are coaxially disposed. An integral hex portion 158 is formed adjoining the head portion 152 to assist in turning the second section 150 during assembly.

The connecting nut 160 fits over the head portions of both sections and has internal threads which engage with external threads 157 formed on the head portion 152 of the second section 150. A ball bearing 162 is installed between an end wall 161 of the connecting nut 160 and the head portion 142 of the first section 140 to prevent torques from being transmitted from the connecting nut 160 to the first section 140.

In contrast to a Super JSK connector in which annular recesses 44 and 54 are formed in the opposing end surfaces of the first and second sections 40 and 50, in an MCG connector, the opposing ends of the head portions 142 and 152 have opposing flat surfaces 144 and 154, respectively, for sealing contact with a sealing member 70.

The radially inner periphery of each flat surface 144 and 154 is connected to the corresponding central bore 143 or 153 by a chamfered surface 145 and 155, respectively. The edges where chamfered surfaces 145 and 155 join the central bores 143 and 153 are indicated by reference numerals 146 and 156, respectively.

An MCG connector is assembled in essentially the same manner as described above with respect to a Super JSK connector, with the exception that tightening of the connecting nut 160 causes the sealing member 70 to be pressed into sealing contact with the flat surfaces 144 and 154 of the head portions 142 and 152 rather than into sealing contact with annular recesses.

FIG. 16 illustrates an MCG connector being employed with a filter of the type illustrated in FIG. 7 having a base 90 with a flange 92 in sealing contact with the sealing member 70. However, an MCG connector can also be employed with other types of filters according to the present invention, such as the types illustrated in FIG. 1 or FIG. 4.

Figure 17:
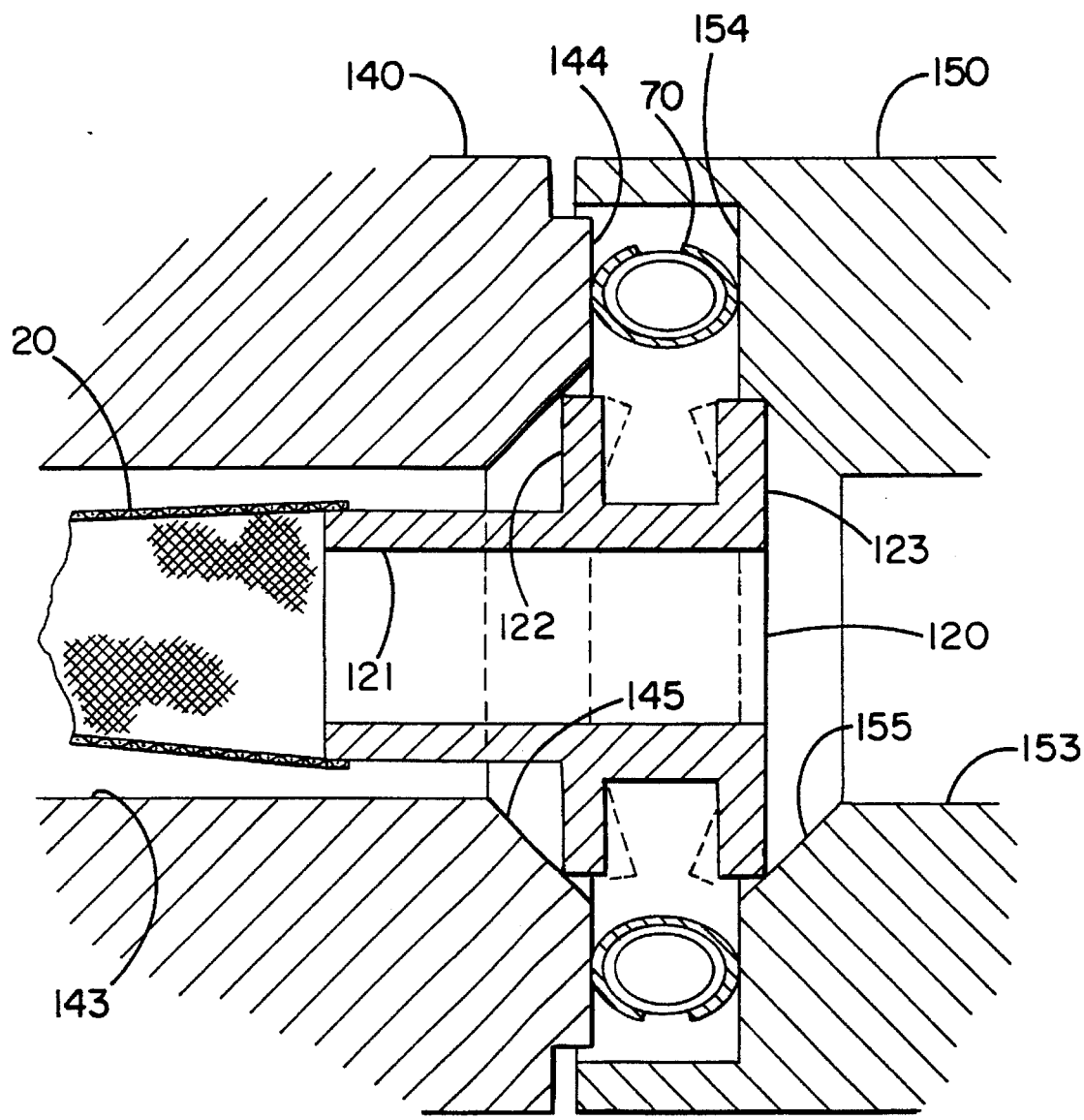
FIG. 17 is a longitudinal cross-sectional view of another embodiment of the present invention installed in a tubing connector.

In the embodiments of FIGS. 1–6, the wall portions of the filter base which sealingly contact internal surfaces of the connector sections 40 and 50 are portions of a bulged section defining the central bore of the filter base. However, the base need not have a bulged section. FIG. 17 illustrates another embodiment of a filter according to the present invention installed inside a conventional MCG tubing connector of the type illustrated in FIG. 16. This embodiment includes a hollow, resilient base 120 and a filter element 20. The base 120 is designed to seal against the chamfered surfaces 145 and 155 of the two sections 140 and 150 of the connector. The base 120 comprises a tubular body portion 121 having first and second open ends, one end of which is sealingly connected to the filter element 20. Between the two ends of the tubular body portion 121 are formed a first disk-shaped wall portion 122 and a second disk-shaped wall portion 123 which extend radially outwards from the tubular body portion 121. The spacing between the two wall portions 122 and 123 and their outer diameters are selected such that when the base 120 is disposed inside a tubing connector, an edge of the outer periphery of the first wall portion 122 will contact chamfered surface 145, and an edge of the outer periphery of the second wall portion 123 will contact chamfered surface 155. The base 120 can be made of the same materials used for the bases of the preceding embodiments.

The solid lines in FIG. 17 show the shape of the wall portions 122 and 123 prior to deformation when the connector has been assembled to a finger-tight state. When the connector is tightened by means of an unillustrated connecting nut, the two connector sections 140 and 150 are forced towards each other, and in the process, the two wall portions 122 and 123 are resiliently deformed towards each other by bending with respect to the centerline of the base 120 to the shapes shown by dashed lines. The wall portions 122 and 123 try to resist the deformation, so an edge of the outer periphery of each of wall portions 122 and 123 is pressed into sealing contact with chamfered surfaces 145 and 155, respectively. However, the wall portions 122 and 123 can instead by shaped so as to be in surface contact with the chamfered surfaces 145 and 155. At this time, the wall portions 122 and 123 are in substantially line contact or limited surface contact with the chamfered surfaces 144 and 155. At the same time that the wall portions 122 and 123 are deformed, the sealing member 70 is deformed into sealing contact with the flat surfaces 144 and 154 to form the main seal for the connector. As in the previous embodiments, the seals formed between the wall portions 122 and 123 of the base 120 and the chamfered surfaces 145 and 155 need not have as high an integrity as the seals formed by the sealing member 70, and they need only be good enough to prevent particles too large to pass through the filter element 20 from bypassing the filter element 20.

The filter of FIG. 17 can be employed with other types of tubing connectors, such as a Super JSK connector like that illustrated in FIG. 2. Furthermore, it is not necessary for the tubing connector to have chamfered surfaces corresponding to surfaces 145 and 155, and the wall portions 122 and 123 can seal against any opposing surfaces of the tubing connector.

A filter according to the present invention has been described above as used with conventional, commercially-available tubing connectors. However, the present invention is not limited to use with these particular connectors and can be employed with other types that permit sealing contact between the filter and the connector.

What is claimed is:

1. A filter arranged to be installed in a tubing connector having first and second sections, the filter comprising:

a hollow base having first and second open ends, a centerline, and first and second wall portions formed between the ends and sloped in opposite directions with respect to the centerline, the wall portions being deformable between a first position in which the wall portions are spaced a first distance from each other before the connector sections are tightened together and a second position in which the wall portions are sealed against the connector sections and spaced a second distance from each other after the connector sections are tightened together, each wall having an inner surface and an outer surface shaped similarly to the inner surface; and a filter element mounted on the base.

2. A filter as claimed in claim 1 wherein the first and second wall portions each have a constant slope and the base includes a third wall portion having an arcuate cross-section connecting the first and second wall portions.

3. A filter as claimed in claim 1 wherein the base has a shape of a body of revolution.

4. A filter as claimed in claim 1 comprising an end cap sealing an end of the filter element.

5. A filter as claimed in claim 1 wherein the base comprises a tubular section on which the filter element is mounted.

6. A filter as claimed in claim 1 wherein the inner and outer surface of each wall are each defined by a smooth curve.

7. A filter as claimed in claim 1 wherein an angle between the first and second wall portions decreases between the first and second positions.

8. A filter as claimed in claim 1 wherein an angle of slope of each wall portion with respect to a longitudinal axis of the base changes between the first and second positions.

9. A filter as claimed in claim 1 wherein a vent hole is formed through the base between the open ends.

10. A filter arranged to be installed in a tubing connector having first and second sections, the filter comprising:

a hollow base formed from metal tubing and having first and second open ends, a centerline, and first and second wall portions formed between the ends and sloped in opposite directions with respect to the centerline, the wall portions being deformable between a first position in which the wall portions are spaced a first distance from each other before the connector sections are tightened together and a second position in which the wall portions are sealed against the connector sections and spaced a second distance from each other after the connector sections are tightened together; and a filter element mounted on the base.

11. A filter as claimed in claim 10 wherein the base has a shape of a body of revolution.

12. A filter as claimed in claim 10 comprising an end cap sealing an end of the filter element.

13. A filter as claimed in claim 10 wherein the base comprises a tubular section on which the filter element is mounted.

14. A filter as claimed in claim 10 wherein a vent hole is formed through the base between the open ends.

15. A filter arranged to be installed in a tubing connector having first and second sections, the filter comprising:
  a hollow base formed from metal tubing in an annealed state and having first and second open ends and first and second wall portions formed between the ends, the wall portions being deformable between a first position in which the wall portions are spaced a first distance from each other before the connector sections are tightened together and a second position in which the wall portions are sealed against the connector sections and spaced a second distance from each other after the connector sections are tightened together; and
  a filter element mounted on the base.

16. A filter arranged to be installed in a tubing connector having first and second sections, the filter comprising:
  a hollow base having first and second open ends and first and second wall portions formed between the ends and a vent hole formed through the base between the open ends, the wall portions being deformable between a first position in which the wall portions are spaced a first distance from each other before the connector sections are tightened together and a second position in which the wall portions are sealed against the connector sections and spaced a second distance from each other after the connector sections are tightened together, each wall having an inner surface and an outer surface shaped similarly to the inner surface; and
  a filter element mounted on the base.

17. A filter arranged to be installed in a tubing connector having first and second sections, the filter comprising:
  a hollow base having a centerline and a radially outwardly extending flange;
  a resilient sealing ring mounted on the flange and having a hollow transverse cross section, the sealing ring being deformable against at least the first connector section when the connector sections are tightened together to sealingly contact the flange and the first connector section; and
  a filter element mounted on the base.

18. A filter arranged to be installed in a tubing connector having first and second sections, the filter comprising:
  a hollow base having a centerline and a radially outwardly extending flange having an outer periphery;
  a resilient sealing ring mounted on the outer periphery of the flange, the sealing ring being deformable against at least the first connector section when the connector sections are tightened together to sealingly contact the flange and the first connector section; and
  a filter element mounted on the base.

19. A filter as claimed in claim 18 wherein the sealing ring is press fit on the outer periphery of the flange.

20. A filter as claimed in claim 18 wherein the sealing ring loosely fits on the outer periphery of the flange prior to the connector sections being tightened to one another.

21. A filter as claimed in claim 20 wherein the outer periphery of the flange has first and second lateral edges, and the distance of the lateral edges from the centerline of the base is greater than the inner radius of the sealing ring in an undeformed state as measured from the centerline of the base.

22. A filter as claimed in claim 21 wherein the outer periphery has a notch formed therein, and the sealing ring is disposed in the notch.

23. A filter as claimed in claim 17 wherein the flange has a lateral surface and the sealing ring is mounted on the lateral surface.

24. A filter as claimed in claim 23 wherein the lateral surface has an annular recess for receiving the sealing ring.

25. A filter as claimed in claim 24 wherein the flange has first and second lateral surfaces each having an annular recess, the sealing ring is received in the annular recess of the first lateral surface, and another sealing ring is received in the annular recess of the second lateral surface.

26. A filter as claimed in claim 18 wherein the sealing ring comprises a metal ring.

27. A filter as claimed in claim 18 wherein the sealing ring has an oval transverse cross section prior to sealingly contacting the first connection section.

28. A filter as claimed in claim 18 wherein the flange includes a lip formed along a lateral edge of the outer periphery of the flange and outwardly deformed to restrain lateral movement of the sealing ring on the flange.

29. A filter as claimed in claim 18 wherein the sealing ring has a greater thickness than the flange measured in an axial direction of the base.

30. A tubing connector assembly comprising:
  a tubing connector including a first connector section having a first hollow bore and a first end surface, a second connector section having a second hollow bore coaxial with the first hollow bore and having a second end surface opposing the first end surface, and a sealing member disposed between the first and second end surfaces for forming a seal between the end surfaces;
  a hollow filter base disposed within the tubing connector between the first and second connector sections and having a centerline, first and second open ends, and first and second wall portions formed between the ends and sloped in opposite directions with respect to the centerline and having opposing internal surfaces separated by a gap, the first and second wall portions being resiliently deformed into sealing contact with the first and second connector sections, respectively; and
  a filter element mounted on the base.

31. An assembly as claimed in claim 30 wherein the wall portions are in substantially line contact with the first and second connector sections.

32. An assembly as claimed in claim 30 wherein the wall portions are in surface contact with the first and second connector sections.

33. An assembly as claimed in claim 32 wherein each of the end surfaces has a chamfer formed therein, and the wall portions sealingly contact the chamfers.

34. An assembly as claimed in claim 33 wherein the first wall portion has a constant slope with respect to the centerline of the base, and a difference between the slope of the first wall portion prior to deformation and a slope of the chamfer of the first connector section is less than approximately 20 degrees.

35. An assembly as claimed in claim 34 wherein the difference in slope is approximately 2 to approximately 10 degrees.

36. An assembly as claimed in claim 31 wherein each of the connector sections has an edge where the end surface meets the bore, and the wall portions of the base sealingly contact the connector sections along the edges.

37. An assembly as claimed in claim 36 wherein the first wall portion is sloped with respect to the centerline of the base, and an angle between a tangent to the first wall portion prior to deformation and the end surface of the first connector section at the edge of the first connector section is approximately 5 to approximately 80 degrees.

38. An assembly as claimed in claim 37 wherein the angle is approximately 30 to approximately 55 degrees.

39. An assembly as claimed in claim 36 wherein an angle between a tangent to the first wall portion prior to deformation and the first bore at the edge of the first connector section is at least approximately 10 degrees.

40. An assembly as claimed in claim 30 wherein the integrity of a seal between the sealing member and the connector sections is higher than an integrity of a seal between the wall portions of the base and the connector sections.

41. An assembly as claimed in claim 30 wherein the sealing member and the base are separated by a gap when the wall portions are in a deformed state.

42. An assembly as claimed in claim 30 wherein the base has a vent hole formed between its open ends and communicating with a space between the end surfaces of the connector sections.

43. A tubing connector assembly comprising:

a tubing connector including a first connector section having a first hollow bore and a first end surface, a second connector section having a second hollow bore coaxial with the first hollow bore and having a second end surface opposing the first end surface, and a sealing member disposed between the first and second end surfaces for forming a seal between the end surfaces;

a hollow filter base disposed within the tubing connector between the first and second connector sections and having a centerline, first and second open ends, first and second wall portions formed between the ends and having opposing internal surfaces separated by a gap, and a vent hole formed between the open ends of the base and communicating with a space between the end surfaces of the connector sections, the first and second wall portions being resiliently deformed into sealing contact with the first and second connector sections, respectively; and a filter element mounted on the base.

44. A tubing connector assembly comprising:

a first connector section having a first hollow bore and a first end surface;

a second connector section having a second hollow bore coaxial with the first hollow bore and a second end surface opposing the first end surface;

a hollow base disposed between the connector sections and having a centerline and a radially outwardly extending flange;

a resilient sealing ring mounted on the flange and having a hollow transverse cross section and pressed into sealing contact with the flange and the first end surface; and a filter element mounted on the base.

45. An assembly as claimed in claim 44 wherein the flange has an outer periphery, and the sealing ring is mounted on the outer periphery and sealingly contacts the outer periphery and the first and second end surfaces of the connector sections.

46. An assembly as claimed in claim 44 wherein the flange has a lateral surface, and the sealing ring is mounted on the lateral surface.

47. An assembly as claimed in claim 45 wherein the sealing ring comprises a metal ring.

48. An assembly as claimed in claim 45 wherein the sealing ring has an oval transverse cross section when not contacting the end surfaces.

49. An assembly as claimed in claim 45 wherein the sealing ring is press fit on the outer periphery of the flange.

50. An assembly as claimed in claim 45 wherein the sealing ring loosely fits on the outer periphery of the flange when not contacting the end surfaces.

51. An assembly as claimed in claim 45 wherein the outer periphery of the flange has first and second lateral edges, and the distance of the lateral edges from the centerline of the base is greater than the inner radius of the sealing ring in an undeformed state as measured from the centerline of the base.

52. An assembly as claimed in claim 51 wherein the outer periphery of the flange has a notch formed therein, and the sealing ring is disposed in the notch.

53. An assembly as claimed in claim 45 wherein the flange includes a lip formed along a lateral edge of the outer periphery of the flange and outwardly deformed to restrain lateral movement of the sealing ring on the flange.

54. An assembly as claimed in claim 45 wherein the sealing ring has a greater thickness than the flange measured in an axial direction of the base.

55. An assembly as claimed in claim 45 wherein each end surface includes an annular recess which sealingly contacts the sealing ring.

56. An assembly as claimed in claim 45 wherein each end surface includes a planar portion which sealingly contacts the sealing ring.

57. A filter arranged to be installed in a tubing connector having first and second sections, the filter comprising:

a hollow base having a tubular body with first and second open ends and first and second opposing wall portions extending from the body, each wall portion having an inner peripheral portion connected to the body and an outer peripheral portion, the outer peripheral portions having opposing surfaces separated by a gap, the wall portions being deformable between a first position in which the outer peripheral portions are spaced a first distance from each other before the connector sections are tightened together and a second position in which the outer peripheral portions are sealed against the connector sections and spaced a second distance from each other after the connector sections are tightened together; and a filter element mounted on the base.

58. A filter as claimed in claim 57 wherein each wall portion is disk-shaped.

59. A filter as claimed in claim 57 wherein the first and second wall portions are substantially parallel in an undeformed state.

60. A filter arranged to be installed in a tubing connector having first and second sections, the filter comprising:

a hollow metal base having first and second open opposite axial ends and first and second wall portions formed between the ends, the first wall portion having an internal surface opposing an internal surface of the second wall portion, the wall portions being deformable between a first position in which the wall portions are spaced a first distance from each other before the connector sections are tightened together and a second position in which the wall portions are sealed against the connector sections and spaced a second distance from each other after the connector sections are tightened together; and a filter element secured to one of the ends of the base.

61. A filter as claimed in claim 60 wherein the base is formed by deforming a length of metal tubing.

62. A filter as claimed in claim 61 wherein the metal tubing has a constant wall thickness and diameter prior to deformation.

63. A filter as claimed in claim 60 wherein the filter element is secured to an exterior surface of the base.

64. A filter as claimed in claim 60 wherein the filter element is welded to the base.

65. A filter arranged to be installed in a tubing connector having first and second sections, the filter comprising:

a hollow base formed from metal tubing and having first and second open ends, first and second wall portions each having a constant slope formed between the ends, and a third wall portion having an arcuate cross-section connecting the first and second wall portions, the first and second wall portions being deformable between a first position in which the first and second wall portions are spaced a first distance from each other before the connector sections are tightened together and a second position in which the first and second wall portions are sealed against the connector sections and spaced a second distance from each other after the connector sections are tightened together; and a filter element mounted on the base.

66. A filter arranged to be installed in a tubing connector having first and second sections, the filter comprising:

a hollow base formed from metal tubing and having first and second open ends and first and second wall portions formed between the ends and a vent hole formed through the base between the open ends, the wall portions being deformable between a first position in which the wall portions are spaced a first distance from each other before the connector sections are tightened together and a second position in which the wall portions are sealed against the connector sections and spaced a second distance from each other after the connector sections are tightened together; and a filter element mounted on the base.

67. A tubing connector assembly comprising:

a tubing connector including a first connector section having a first hollow bore and a first end surface, a second connector section having a second hollow bore coaxial with the first hollow bore and having a second end surface opposing the first end surface, and a sealing member disposed between the first and second end surfaces for forming a seal between the end surfaces;

a hollow base disposed within the tubing connector between the first and second connector sections and formed from metal tubing and having first and second open opposite axial ends and first and second wall portions formed between the ends, the wall portions being deformable between a first position in which the wall portions are spaced a first distance from each other before the connector sections are tightened together and a second position in which the wall portions are sealed against the connector sections and spaced a second distance from each other after the connector sections are tightened together; and a filter element secured to one of the ends of the base.

68. An assembly as claimed in claim 67 wherein the filter element is secured to an exterior surface of the base.

69. A filter as claimed in claim 67 wherein the filter element is welded to the base.

* * * * *